(12) United States Patent
Zheng et al.

(10) Patent No.: US 11,263,300 B2
(45) Date of Patent: Mar. 1, 2022

(54) VOICE ACTIVATION METHOD FOR SERVICE PROVISIONING ON SMART ASSISTANT DEVICES

(71) Applicant: Samsung Electronics Co., Ltd., Suwon-si (KR)

(72) Inventors: Pei Zheng, Sammamish, WA (US); Yu Wang, Bellevue, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 15/659,555

(22) Filed: Jul. 25, 2017

(65) Prior Publication Data

US 2019/0034604 A1 Jan. 31, 2019

(51) Int. Cl.
| | |
|---|---|
| *G06F 21/32* | (2013.01) |
| *H04L 29/06* | (2006.01) |
| *G10L 15/30* | (2013.01) |
| *H04L 12/28* | (2006.01) |
| *G10L 17/22* | (2013.01) |

(52) U.S. Cl.
CPC .............. *G06F 21/32* (2013.01); *G10L 15/30* (2013.01); *H04L 12/2829* (2013.01); *H04L 63/0861* (2013.01); *G10L 17/22* (2013.01)

(58) Field of Classification Search
CPC .......... G06F 21/31; G06F 21/32; G06F 3/017; G10L 17/00; G10L 17/24; G10L 15/25
See application file for complete search history.

(56) References Cited

U.S. PATENT DOCUMENTS

| | | | |
|---|---|---|---|
| 9,430,630 B2 | 8/2016 | Foster et al. | |
| 2013/0097682 A1* | 4/2013 | Zeljkovic | H04L 9/3231 726/7 |
| 2013/0132091 A1* | 5/2013 | Skerpac | G10L 17/005 704/273 |
| 2013/0247165 A1* | 9/2013 | Pal | H04L 63/08 726/10 |
| 2014/0189841 A1* | 7/2014 | Metke | G06F 21/40 726/9 |
| 2014/0365216 A1* | 12/2014 | Gruber | G10L 13/027 704/235 |
| 2015/0213355 A1* | 7/2015 | Sharma | G06F 3/167 706/11 |
| 2015/0301796 A1* | 10/2015 | Visser | G06F 3/167 715/728 |
| 2015/0350170 A1* | 12/2015 | Roselle | H04W 12/06 713/171 |
| 2016/0173578 A1* | 6/2016 | Sharma | G06F 17/2785 709/203 |

(Continued)

FOREIGN PATENT DOCUMENTS

EP 3396667 A1 * 10/2018 ............ G10L 17/22

*Primary Examiner* — Mark Villena

(57) ABSTRACT

A device and a method for authenticating a user. The method includes selecting the phrase key from a plurality of phrase keys. The method also includes receiving, from a target service a file that includes parsed data based on speech recognition processing of a phrase spoken by a user. Additionally, the method includes sending a notification the target service, upon a determination that the parsed data matches a phrase key. The method further includes receiving a set of user credentials from the target service and sending the set of user credentials to the virtual assistant device.

20 Claims, 5 Drawing Sheets

(56) References Cited

U.S. PATENT DOCUMENTS

| | | | | |
|---|---|---|---|---|
| 2016/0342851 | A1* | 11/2016 | Holz | G06K 9/00906 |
| 2017/0199998 | A1* | 7/2017 | Bruno | G06F 21/34 |
| 2017/0263249 | A1* | 9/2017 | Akbacak | G10L 15/08 |
| 2017/0286651 | A1* | 10/2017 | Erhart | B25J 9/0003 |
| 2017/0357478 | A1* | 12/2017 | Piersol | G06F 3/167 |
| 2018/0082052 | A1* | 3/2018 | Swart | G06F 21/40 |
| 2018/0191701 | A1* | 7/2018 | Kong | H04L 63/0853 |
| 2018/0293981 | A1* | 10/2018 | Ni | G10L 15/22 |

* cited by examiner

VOICE ACTIVATION METHOD FOR SERVICE PROVISIONING ON SMART ASSISTANT DEVICES

TECHNICAL FIELD

This disclosure relates generally to field authentication. More specifically, this disclosure relates to voice activation method for service provisioning on smart assistant devices.

BACKGROUND

Virtual assistant, smart assistant, Artificial Intelligent (AI) assistant, and smart hub, collectively referred to herein as virtual assistant devices, are a family of devices which can perform various tasks and/or services for a user. Capabilities of virtual assistants are expanding rapidly and are being integrated into many platforms. Virtual assistant devices may provide a variety of services such as providing the weather, setting an alarm, creating and maintaining shopping lists, playing music, turning on a television show, streaming a movie to a secondary device, switching on/off a smart light bulb, to name a few. Due to virtual assistant device's rapidly growing market share, many third party entities are creating their own services and applications to run on a virtual assistant platform for a user.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

SUMMARY

This disclosure provides voice activation method for service provisioning on smart assistant device.

In a first embodiment, a server for authenticating a user is provided. The server includes a communication interface configured to communicate with a virtual assistant device (VAD); and at least one processor coupled to the communication interface. The at least one processor is configured to receive, via the communication interface from a target service, a file that includes parsed data based on speech recognition processing of a phrase spoken by a user. The at least one processor is also configured to send, via the communication interface, a notification to the target service, upon a determination that the parsed data matches a phrase key. Additionally, the at least one processor is configured to receive via the communication interface a set of user credentials from the target service and send the set of user credentials to the VAD.

In a second embodiment, a virtual assistant device for authenticating a user is provided. The device includes a transceiver configured to communicate with a server, a speaker configured to play an audio data file to a user; and at least one processor coupled to the transceiver and the speaker. The at least one processor configured to receive, via the transceiver, a request to configure one or more target services to the VAD, wherein the one or more target services are associated with a user account based on a set of user credentials. The at least one processor is also configured to notify the user to verbally recite a phrase key. The at least one processor is also configured to receive, from the server, via each of the one or more target services, the set of user credentials granting the VAD access to the user account associated with each of the one or more target services, as a result of the verbal recitation matching the phrase key.

In a third embodiment, a method for authenticating a user is provided. The method includes receiving from a target service a file, that includes parsed data based on speech recognition processing of a phrase spoken by a user. The method also includes sending a notification to the target service, upon a determination that the parsed data matches a phrase key. Additionally, the method includes receiving from the target service a set of user credentials and sending the set of user credentials to the VAD.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
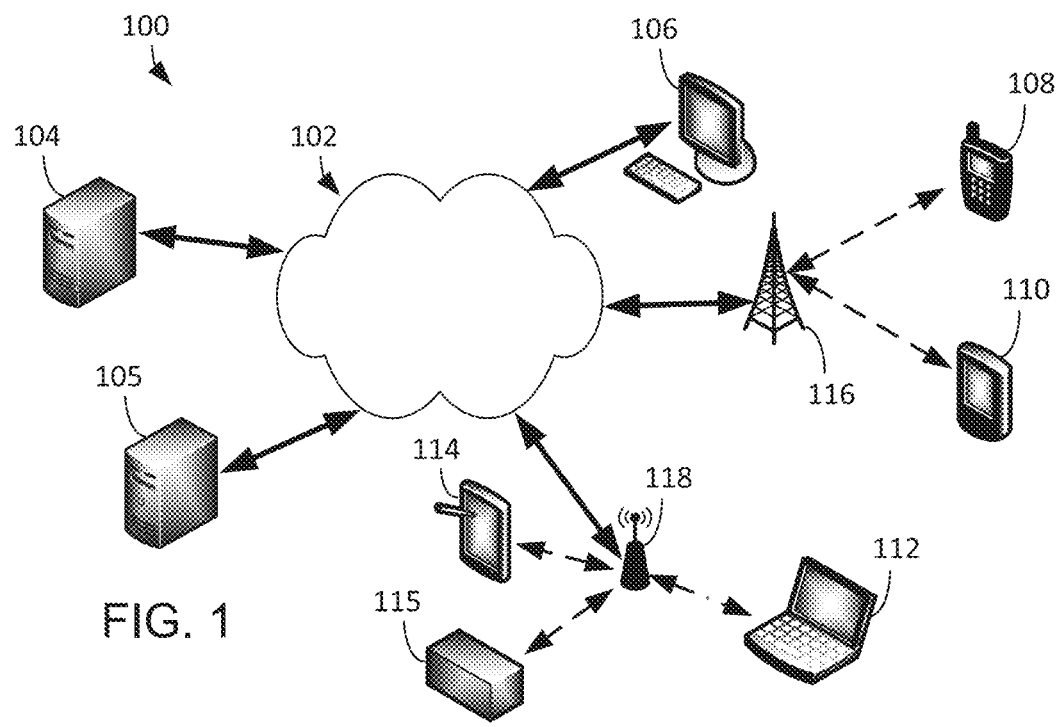
FIG. 1 illustrates an example communication system in which various embodiments of the present disclosure may be implemented.

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Embodiments of the present disclosure recognize that virtual assistants are a family of devices that provide a variety of services to a user based on artificial intelligence, voice recognition, machine learning capabilities and the like. Exemplary services a virtual assistant may perform include: voice interaction, music playback, making to-do lists, setting alarms, streaming podcasts, playing audiobooks, and providing weather, traffic, news and other real time information. Services, provided by the virtual assistant may originate from the manufacturer and/or by a third party entity. A third party entity may provide services and applications to be provisioned and run on a virtual assistant platform for a user. By enabling third party service providers to build and provide services into a virtual assistant's platform, it allows a user of the virtual assistant device to interact with each specific service provided by each third party service provider.

Embodiments of the present disclosure further recognize that often third party service providers allow a user to configure and personalize the services provided. Therefore, third party service providers generally provide a user with authentication and verification protocols, thereby effectively limiting access to a user's customizations for each specific user. Further, a user may access their specific customizations across a plurality of connected devices, once the user authentication is verified by the third party. Often the verification process is accomplished through a logon protocol (i.e., user name and password).

Embodiments of the present disclosure further recognize that in addition of user personalization and customization of services, provided by a third party service provider, various service providers may provide services for free, as well as for a fee (e.g., services which are subscription-based, and services which are usage based, etc.). Therefore, by providing a user with authentication and verification protocols, attempts to limits unauthorized access to subscriptions and personalization to each specific user. For example, a subscription based movie rental streaming service running on a virtual assistant may, upon a voice command, be capable of turning on a specific television, and play the requested movie, and charging user a fee based on the movie rental. If however an unauthorized user accesses the authorized users account and watches a movie, the authorized user may be required to pay the movie rental fee.

Embodiments of the present disclosure further recognize and take into consideration that virtual assistant as used herein, are not limited to a personal use in a residence, rather such devices may be incorporated and used in a variety of locations such as in a car infotainment system, retail locations, as well as a variety of industries such as automotive, telecommunications, retail, healthcare and education, and the like.

Therefore, embodiments of the present disclosure recognize and take into consideration that it may be appropriate to have an interactive and simplified authentication system and methods between a virtual assistant and third party service providers. Embodiments of the present disclosure provide numerous advantages by providing authentication systems and methods which enable a user to authenticate one's self to one or more services without requiring the user to remember and/or provide login credentials (i.e., user identification and password).

Reference is now made to FIG. 1. As shown in FIG. 1, the system 100 includes a network 102, which facilitates communication between various components in the system 100. For example, the network 102 may communicate Internet Protocol (IP) packets or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between at least two servers, server 104 and server 105 and various client devices 106-115. Each server 104 and 105 may represent one or more servers. Each server 104 and 105 includes any suitable electronic computing or processing device that can provide computing services for one or more client devices. Each server 104 and 105 could, for example, include one or more processing devices, one or more memories storing instructions and data, and one or more network interfaces facilitating communication over the network 102. Server 104 and server 105 may, for example, operate one or more applications to authenticate a user between a virtual assistant and a third party service provider. In another example, server 104 and server 105 may facilitate transfer of authentication protocols among the client devices 106-115.

Each client device 106-115 represents any suitable electronic computing or processing device that interacts with at least one server or other computing device(s) over the network 102. Client device 106-115 may or may not have a user interface display. In this example, the client devices 106-115 include electronic devices, such as, for example, a desktop computer 106, a mobile telephone or smartphone 108, a personal digital assistant (PDA) 110, a laptop computer 112, a tablet computer 114, a virtual assistant 115, car infotainment center (not shown), a media player (not shown), a media streaming device (not shown), a television (not shown), a wearable device (not shown), a smartwatch (not shown), etc. However, any other or additional client devices could be used in the system 100.

In this example, some client devices 108-115 communicate indirectly with the network 102. For example, the client devices 108 and 110 communicate via one or more base stations 116, such as cellular base stations or eNodeBs. Also, the client devices 112-115 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, the server 104 identifies that one or more client devices 106-115 may need to receive authentication from a third party service provider (associated with server 105, hereinafter target service, and described in more detail below) in order to access content through the target service servers. For example, a user may request virtual assistant 115 to access, link, and retrieve content from a particular target service credentials. Server 104 may identify and provide a various provisioning tools to provide authentication between virtual assistant 115 and the target service associated with target service server 105.

Although FIG. 1 illustrates one example of a networked system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. For instance, smartphones 108 can connect to network 102 via base stations 116 and/or wireless access points 118. For another instance, server 104 may represent, for example, a server associated with virtual assistant 115, and server 105 may represent, for example, a server for a third party service provider such as a target service (discussed in more detail below). While FIG. 1 illustrates one operational environment in which various features disclosed in this patent document can be used, these features could be used in any other suitable system.

Figure 2:
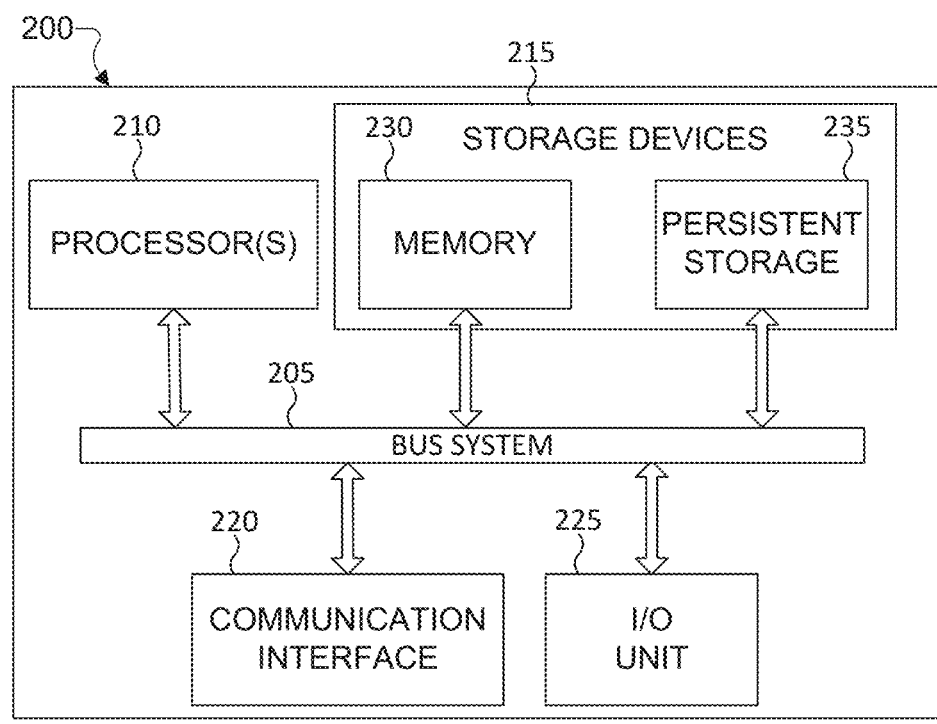
FIG. 2 illustrates an example server according to various embodiments of the present disclosure.
Figure 3:
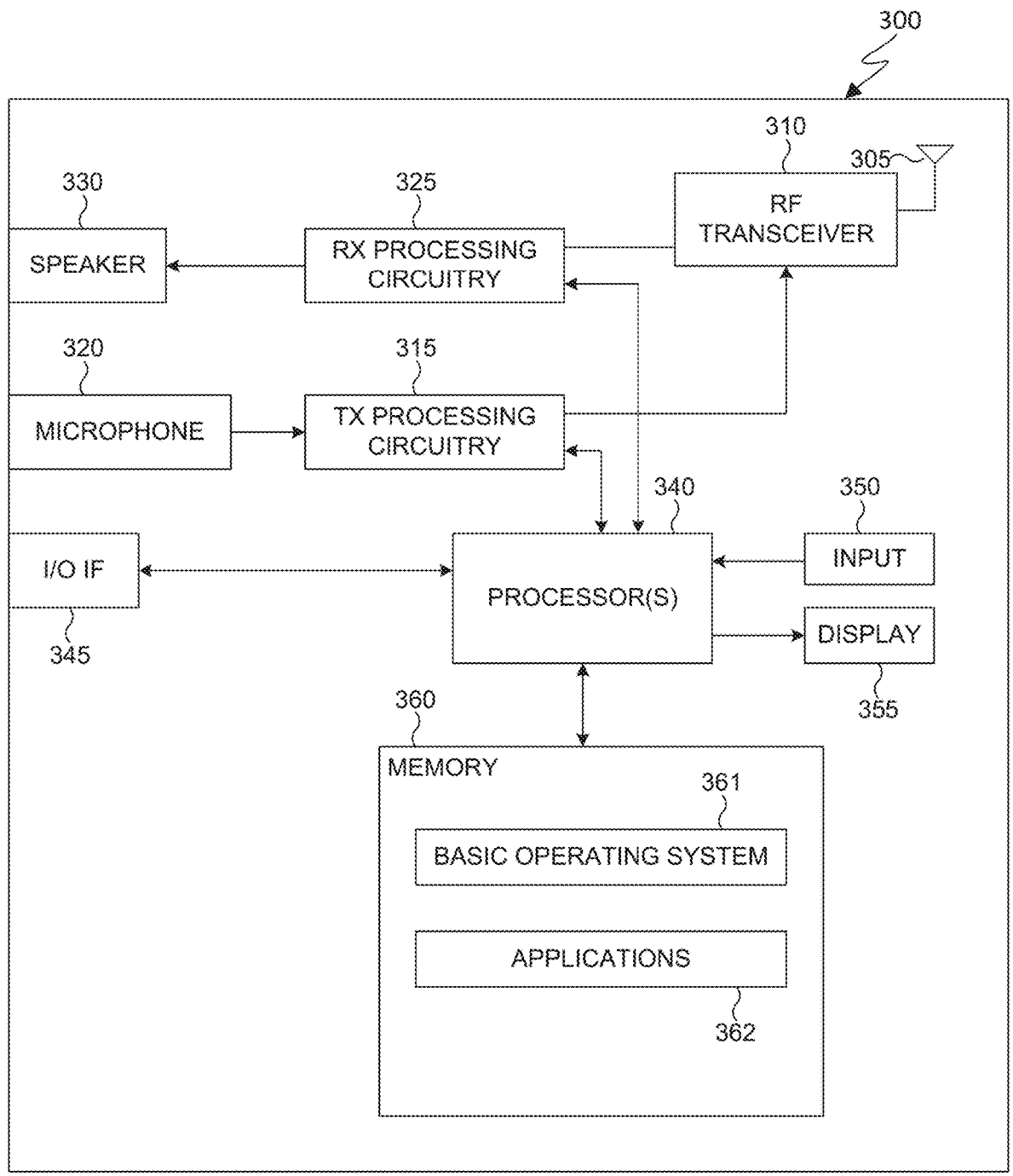
FIG. 3 illustrates an example electronic device according to various embodiments of the present.

FIGS. 2 and 3 illustrate example electronic devices in a communication system according to various embodiments of the present disclosure. In particular, FIG. 2 illustrates an example server 200, and FIG. 3 illustrates an example electronic device 300. In this illustrative example, the server 200 represents server 104 and server 105 in FIG. 1, and the electronic device 300 could represent one or more of the client devices 106-115 in FIG. 1.

As shown in FIG. 2, the server 200 includes a bus system 205, which supports communication between at least one processor 210, at least one storage device 215, at least one communications interface 220, and at least one input/output (I/O) unit 225.

The processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry. The processor 210 may be a general-purpose CPU or specific purpose processor for encoding or decoding of video data.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read-only memory, hard drive, Flash memory, or optical disc.

The communications interface 220 supports communications with other systems or devices. For example, the communications interface 220 could include a network interface card or a wireless transceiver facilitating communications over the network 102. The communications interface 220 may support communications through any suitable physical or wireless communication link(s). The communications interface 220 may include only one or both of a transmitter and receiver, for example, only a receiver may be included in a decoder or only a transmitter may be included in an encoder.

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

As described in more detail below, the server 200 may be a server in a CMS that identifies and provides authentication and verification of a user between one or more client device 108-115 and a target service. For example, server 200 may represent the internal configuration of server 104 and server 105 of FIG. 1. Server 200 illustrates a server capable of identifying and providing authentication and verification of a user between server 104, associated with virtual assistant 115, and a server 105, associated with a target service.

FIG. 3 illustrates an example electronic device 300 according to various embodiments of the present disclosure. The embodiment of the electronic device 300 illustrated in FIG. 3 is for illustration only, and the client devices 106-115 of FIG. 1 could have the same or similar configuration. However, electronic devices come in a wide variety of configurations, and FIG. 3B does not limit the scope of this disclosure to any particular implementation of an electronic device.

As shown in FIG. 3, the electronic device 300 includes an antenna(s) 305, a radio frequency (RF) transceiver 310, TX processing circuitry 315, a microphone 320, and receive (RX) processing circuitry 325. In alternative embodiments, RF transceiver 310 may be a general communication interface (similar to communications interface 220) and may include, for example, RF transceiver, a Bluetooth transceiver, a Wi-Fi transceiver, and the like. In another example, the communications interface 220 may support wired communications, for example, via a network interface card. The electronic device 300 also includes a speaker 330, a processor 340, an input/output (I/O) interface (IF) 345, an input 350, a display 355, and a memory 360. The memory 360 includes an operating system (OS) 361 and one or more applications 362.

The RF transceiver 310 receives, from the antenna 305, an incoming RF signal transmitted by an eNB of the network 102. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data and/or authentication purposes).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors and execute the OS program 361 stored in the memory 360 in order to control the overall operation of the electronic device 300. The processor 340 is also capable of executing other applications 362 resident in the memory 360, such as, one or more applications for the authentication and verification for service provisioning on a target service on, for example one or more client devices 106-115, as discussed in more detail below. In some embodiments, the processor 340 includes at least one microprocessor or microcontroller.

The processor 340 is also capable of executing other processes and programs resident in the memory 360, such as operations that receive, store, and timely instruct by providing authentication and verification of a user. The processor 340 can move data into or out of the memory 360 as required by an executing process. In some embodiments, the processor 340 is configured to execute a plurality of applications 362, such as applications for authentication and service provisioning for electronic device 300.

The processor 340 is also coupled to the I/O interface 345, which provides the electronic device 300 with the ability to connect to other devices, such as laptop computers, handheld computers, virtual assistant 115, and the like. The I/O interface 345 is the communication path between these accessories and the processor 340.

The processor 340 is also coupled to the input 350 and the display 355. The operator of the electronic device 300 can use the input 350 to enter data and inputs into the electronic device 300. For example, the input 350 may be a touchscreen, button, keyboard, track ball, mouse, stylus, electronic pen, etc. In another example, input 350 may include one or more sensor(s) (not shown) that are operably connected to the processor 340. For example, the sensor(s) detect some measureable effect in proximity to the electronic device 300. The sensor(s) may include, for example, inertial sensors (e.g., accelerometers, gyroscope, and magnetometer), optical sensors, motion sensors, cameras, pressure sensors, heart rate sensors, altimeter, breath sensors (e.g., microphone 320), etc. As discussed in greater detail below, in various embodiments, the sensor(s) may be used to authenticate user and thereby provide access to one or more target services. The display 355 may be a liquid crystal display, light emitting diode (LED) display, an optical LED (OLED), an active matrix OLED (AMOLED), or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIGS. 2 and 3 illustrate examples of devices in a communication system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the electronic device 300 configured as a mobile telephone or smartphone, electronic devices could be configured to operate as other types of mobile or stationary devices. In addition, as with computing and communication networks, client devices and servers can come in a wide variety of configurations, and FIGS. 2 and 3 do not limit this disclosure to any particular electronic devices.

Embodiments of the present disclosure provide for a simplified authentication system and method between a virtual assistant and one or more target services. Further, embodiments of the present disclosure provide solutions for linking various target services to a virtual assistant and/or authenticating a user's credentials without requiring the user to remember and/or provide login credentials (i.e., user identification and password). Various embodiments provide for a creative use of user authentication protocols such as, speech recognition and natural language processing.

Figure 4:
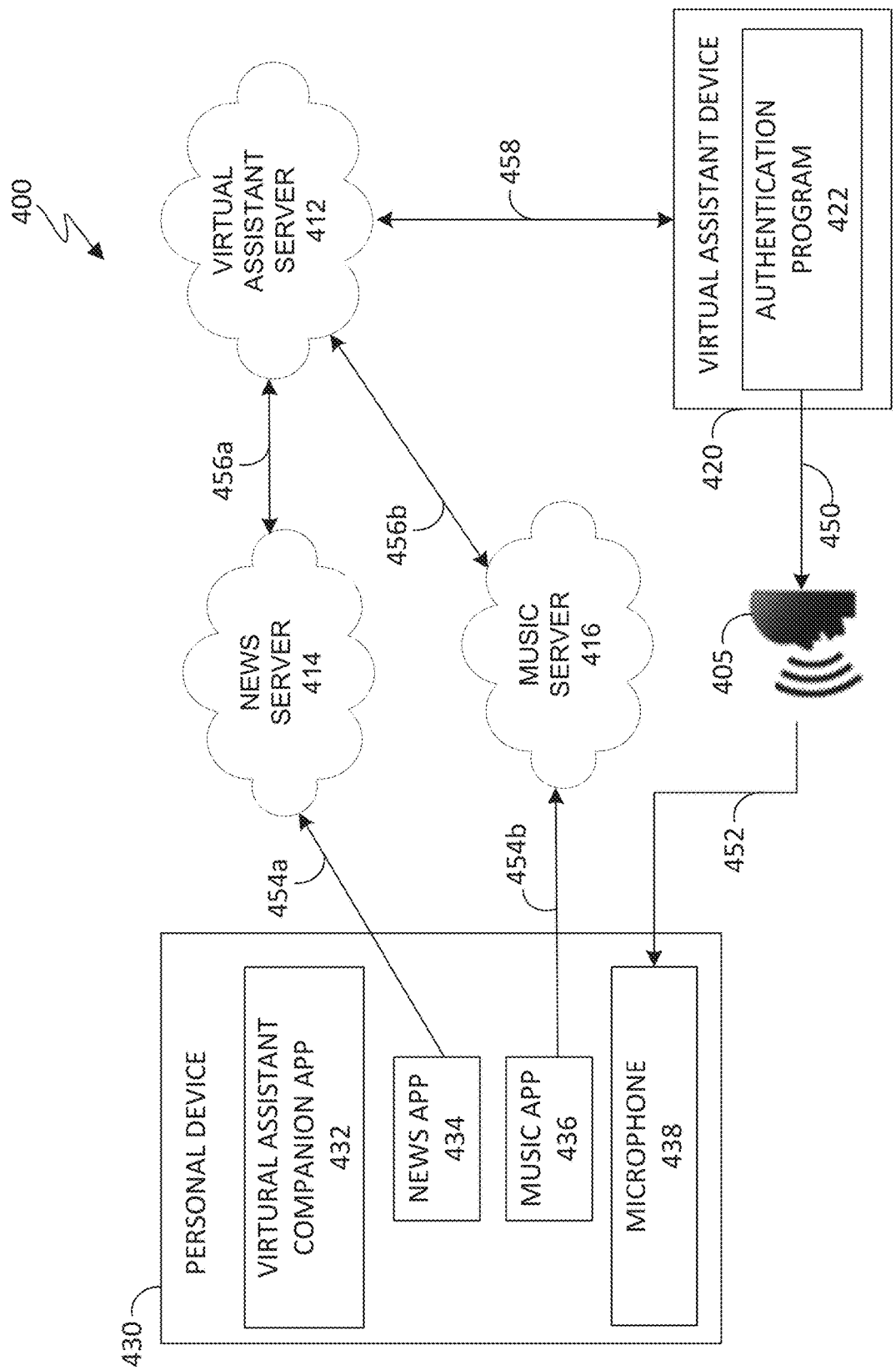
FIG. 4 illustrates an example a block diagram in accordance with various embodiments of the present disclosure.

FIG. 4 illustrates an example a block diagram of environment 400 for authenticating a user, in accordance with various embodiments of the present disclosure. Environment 400 is an example of at least a part of the system 100 in FIG. 1. Environment 400 as shown in FIG. 4 is for illustration only. Many modifications to the depicted environment 400 may be made by those skilled in the art without departing from the scope of the disclosure. Other embodiments of the environment 400 could be used without departing from the scope of the present disclosure. In this exemplary embodiment, environment 400 includes a user 405, a virtual assistant device 420 associated with virtual assistant device server 412, a personal device 430, news server 414 and music server 416, all interconnected over network 102.

Virtual assistant device 420 and personal device 430 may include internal and external components as previously depicted and described in further detail with respect to FIG. 3. Virtual assistant server 412, news server 414, and music server 416 may include internal and external hardware components, as previously depicted and described in further detail with respect to FIG. 2. Further, in this illustrative example, the virtual assistant device 420 may represent the virtual assistant 115 in FIG. 1. However, in alternative embodiments, virtual assistant device 420 may represent any client device 106-115 in FIG. 1. Similarly, in this illustrative example, the personal device 430 may represent smartphone 108 in FIG. 1. However, in alternative embodiments, personal device 430 may represent any client device 106-115 in FIG. 1

Embodiments of the present disclosure recognize and take into consideration that virtual assistant device 420 may provide a variety of services, from one or more service providers, to user 405. A service may be an application, program, module, associated with one or more of client devices 106-115. A service may be based on artificial intelligence, voice recognition, machine learning capabilities and the like. Services, available to user 405 on virtual assistant device 420 and personal device 430. Services may originate from the manufacturer and/or by a third party entity. Example services virtual assistant device 420 may perform include: voice interaction, music playback, making to-do lists, setting alarms, streaming podcasts, playing audiobooks, and providing weather, traffic, news and other real time information. Environment 400 depicts two services—news and music, both of which are accessible on personal device 430 via news app 434 and music app 436, respectively. While environment 400 depicts only two services, those skilled in the art may appreciate that number of services may be accessible.

Embodiments of the present disclosure recognize and take into consideration that many service providers (including target services) provide user, e.g., user 405, a personal account, thereby allowing a user to maintain subscriptions, personalization and/or customization of services. Such accounts typically require authentication and verification protocols, thereby effectively limiting access to a user's account with each specific service provider. Each service provider may require their own authentication and verification protocols (i.e., username and password) to grant access to users account, customizations, and/or subscriptions. For example, in order for user 405 to access an existing account (with user 405s specific customizations, and subscription s across the plurality of connected devices) with a service provider, user 405 must first be authenticated and granted access by the service provider. For example, authentication may be granted based on one or more credentials specific to user 405. Often the authentication and/or verification process is accomplished through a logon protocol and/or authentication code (i.e., user name and password).

Therefore, embodiments of the present disclosure provide a dynamic method and system for providing authentication with a specific service provider, (referred herein as a 'target service') on one or more client devices 106-115, without the need for a user to manually configure each individual client device 106-115 in order to launch the requested service associated with a previously established account. Further, embodiments of the present disclosure provide a dynamic method and system for providing authentication with multiple target services concurrently.

As described herein a target service is generally one or more specific services and/or applications to be provisioned and run on one or more of user client devices 106-115. With respect to FIGS. 1 and 4, a target service is a service user 405 requests to have access to on one or more client devices (i.e., client device 106-115). As depicted in FIG. 4, personal device 430 has services NEWS and MUSIC already accessible to user 405 via news app 434 and music app 436, respectively. However, virtual assistant device 420 does not have NEWS and MUSIC services application. Therefore, with respect to virtual assistant, NEWS and MUSIC services may be referred to as target services as these are the specific services user 405 requests to access. Therefore, with respect to FIG. 4, targeted service is a particular service provider which user 405 requests to have access to on virtual assistant device 420, specifically that of NEWS and MUSIC.

For illustrative purposes, user 405 may be a human, animal or a machine capable of following instructions. In an embodiment, user 405 may requests to link a service application account native to personal device 430 to virtual assistant device 420. As depicted in FIG. 4, and discussed in more detail below, user 405 requests to access NEWS and MUSIC (located on personal device 430, and supported by news server 414 and music server 416, respectively), the target services, of on virtual assistant device 420.

Virtual assistant server 412, news server 414 and music server 416 servers are in communication over network 102 of FIG. 1. Virtual assistant server 412 may be similar to server 104 of FIG. 1. News server 414 and/or music server 416 servers may be similar to server 105 of FIG. 1. In an embodiment, virtual assistant server 412, news server 414 and/or music server 416 may represent, cloud computing system utilizing multiple computers as a server system, such as in a cloud computing environment.

Virtual assistant server 412 may communicate with news server 414, music server 416, and/or virtual assistant device 420. News server 414 may communicate with news app 434 and virtual assistant server 412. Similarly music server 416 may communicate with music app 436 and with virtual assistant server 412.

Virtual assistant server 412 may provide content, such as artificial intelligent protocols, natural language processing, voice recognition software, and the like to virtual assistant device 420. Virtual assistant server 412 may also communicate with authentication program 422 of virtual assistant device 420, to provide various authentication protocols.

News server 414 and music server 416 may provide content to personal device 430 through news app 434 and music app 436 respectively. Content provided by either news server 414 or music server 416 may be customized to user 405 preferences and/or related to one or more subscriptions user 405 subscribes to. As depicted in FIG. 4, news server 414 and music server 416 are unable to provide content directly to virtual assistant device 420, as (i) virtual assistant device 420 lacks the respective applications required to perform the services and (ii) user 405 has not provided the authentication required to grant access to users account with each respective service (via news server 414 and music server 416).

In an embodiment virtual assistant device 420, may be similar to electronic device 300. For example, virtual assistant device 420 may comprise microphone 320 (not shown in FIG. 4), speaker 330 (not shown in FIG. 4), and input 350 (not shown in FIG. 4). Virtual assistant device 420 may assist user 405 through artificial intelligence, voice recognition and machine learning capabilities and the like. In an embodiment, user 405 may interact with virtual assistant device 420 through users own voice (i.e., voice recognition software and natural language processing (NLP)). In an embodiment, user 405 may interact with virtual assistant device 420 through a graphical user interface (GUI) associated with virtual assistant device 420. For example, GUI may be native to virtual assistant device 420. For another example, GUI may be native to a secondary device and in communication with virtual assistant device 420 (i.e., virtual assistant companion application 432 on personal device, discussed in greater detail below).

For illustrative purposes FIG. 4 depicts virtual assistant device 420, as a standalone device, however those skilled in the art may appreciate that the authentication methods and systems described herein, associated with virtual assistant device 420, may be accompanied a plurality of another devices including, but not limited to a car-infotainment center, data retrieval systems, and the like.

Authentication program 422 on virtual assistant device 420 provides a simple and secure method of provisioning services (similar to services provided by news server 414 and music server 416) of a target service on virtual assistant device 420. In an alternative embodiment, authentication program 422 is on virtual assistant server 412, and can communicate with virtual assistant device 420. In an embodiment authentication program 422 provides authentication and verification protocols of user 405 to target services in order to provide user 405 accesses to services on virtual assistant device 420.

In an embodiment authentication program 422 embodiments may include randomly selecting a phrase key user is to speak from a plurality of phrase keys. Upon selecting a phrase key authentication program 422 may transmit and send a ground truth of the phrase key to virtual assistant server 412. The phrase key may be limited to specific languages as indicated by user 405. Virtual assistant 420 may instruct the user to orally recite the phrase key. For example, authentication program 422 may instruct virtual assistant device 420 to audibly play the phrase key on a speaker to user 405, and have user 405 repeat the phrase key to microphone 438 on personal device 430. In another example, authentication program 422 may instruct virtual assistant device 420 to transmit and send the phrase key to personal device 430 (via virtual assistant companion application 432), and have user 405 orally read the phrase key to the microphone 438 on personal device 430. In another example, if virtual assistant device 420 includes a GUI, then authentication program 422 may instruct virtual assistant device 420 to display the phrase key on the GUI of virtual assistant device 420 and have user 405 orally read the phrase key to microphone 438 on personal device 430. Authentication program 422 may select the phrase key from an information repository similar to a database of phrases. Additionally and/or alternatively, authentication program 422 may generate the phrase key based on for example natural language processing routines. The ground truth is a set of information which virtual assistant server 412 may use to compare with a received file (a parsed audio file of the phrase key, and will be discussed in greater detail below) and determine whether the received file is similar to the original phrase key.

Additionally, and/or alternatively, embodiments of the present disclosure may include authentication program 422 receiving a phrase key from virtual assistant server 412.

Additionally, and/or alternatively, embodiments may include authentication program 422 randomly selecting a set of instructions directing user to physically move personal device 430 in a set pattern. Authentication program 422 may select the set of instructions from an information repository similar to a database of instructions. Upon selecting a set of instructions, authentication program 422 may transmit and send a ground truth of the instructions key to virtual assistant server 412. Additionally, and/or alternatively, embodiments may include authentication program 422 receiving a set of instructions intended to instruct user to move personal device 430 in a set pattern, from virtual assistant server 412. The set of instructions may require user 405 to move personal device in predetermined directions. For example, the set of instructions may require user 405 to move personal device 430 in an upward, downward, side-to side, forward and backward direction, in any order. For instance, virtual assistant device 420 may, through a speaker instruct the user to move personal device 430 up, down, forward, back, left and then right.

In an embodiment, after a successful authentication and successful linking of accounts to virtual assistant device 420, authentication program 422 may notify user 405.

Personal device 430 may be a mobile device such as a personal digital assistant (PDA), a smart phone, a personal laptop computer, a tablet computer, a netbook computer, a personal computer (PC), a desktop computer, or any programmable electronic device capable of communicating with virtual assistant device 420. Personal device 430 may have a GUI (i.e., a touch screen) allowing user 405 physically interact with one or more services on personal device 430. Personal device 430 contains virtual assistant companion application 432, news app 434, music app 436, and a microphone 438 (similar to microphone 320 of FIG. 3).

In an embodiment virtual assistant companion application (VACA) 432 is an application on personal device 430 which assists user 405 in configuring and operating virtual assistant device 420. VACA 432 is an application on personal device 430 which may be linked and paired to virtual assistant device 420 and programs on virtual assistant device 420. If virtual assistant device 420 lacks a GUI, VACA 432 may utilize the GUI of personal device 430, to provide a GUI for virtual assistant device 420. VACA 432 may communicate with authentication program 422.

In an embodiment, VACA 432 may receive instructions from authentication program 422, to confirm that personal device 430 has one or more target services associated with authentication credentials of user 405. In an embodiment, VACA 432 may receive instructions from authentication program 422, to provide user 405 with a GUI to select one or more target services to be added to virtual assistant device 420. In an embodiment, VACA 432 may receive instructions from authentication program 422, to display, on GUI of personal device 430 a phrase user is to read and speak aloud. In an embodiment, VACA 432 may receive instructions from authentication program 422, to utilize microphone 438 to receive a phrase spoken by user. In an embodiment, VACA 432 may receive instructions from authentication program 422, to collect and parse the phrase (e.g., phrase key) spoken by user, through acoustic speech recognition. In an embodiment, VACA 432 may receive instructions from authentication program 422, to collect and parse the phrase (e.g., phrase key) spoken by user. In an embodiment, VACA 432 may receive instructions from authentication program 422, to parse a phrase spoken by user, through one or more natural language processing techniques. In an embodiment, VACA 432 may receive instructions from authentication program 422, to send the processed phrase to one or more target applications.

News app 434 and music app 436 on personal device 430 are services provided by to user 405. The term 'app' is an abbreviation for software application. Generally an 'app' is a software applications designed to run on for example, client devices 108, 110, 114, and 115 of FIG. 1. News app 434 is associated with news server 414 and music app 436 is associated with music server 416. News app 434 and music app 436 may receive content through news server 414 and music server 416, respectively. In this embodiment user 405 has an account with the service provider of News app 434 as well as an account with the service provider of music app 436. For example, user 405s account with the service provider of News app 434 may contain user preferences, such as to receive specific news alerts and news articles, tailored to user 405s interests. For another example, user 405s account with the service provider of music app 436 may contain a paid subscription service as well as a customization of music tailored to user 405s preferences. Therefore, user 405 maintains two separate accounts with each service provider in order to receive personalized content.

Authentication program 422 initiates upon an indication from user 405, to provision one or more services on virtual assistant device 420. The indication from user 405, to provision one or more services on virtual assistant device 420 may originate, for example, from user 405 instructing virtual assistant device 420 to open a target service not native to virtual assistant device 420. For another example, user 405 may instruct virtual assistant device 420 through VACA 432 to install one or more target services. Other examples are readily apparent to one skilled in the art. Regardless of the exact cause of the indication, arrow 458 depicts authentication program 422 in communication with virtual assistant server 412 to initiate the authentication of user to the target application of News app and music app 436 located on personal device 430. In an embodiment virtual assistant server 412 may provide a randomly selected phrase key to authentication program 422. In an alternative embodiment authentication program 422 may randomly select the phrase key and provide virtual assistant server 412 with the ground truth.

Arrow 450 depicts, authentication program 422, through virtual assistant device 420 broadcasting the randomly selected phrase key for user 405 to hear. In alternative embodiments, authentication program 422 may instruct VACA 432 to display the phrase key to user on the GUI of personal device 430. In an additional embodiment, authentication program 422 through virtual assistant device 420 broadcasts a set of instructions directing user 405 to move personal device 430 in a pattern of identifiable and detectable directions (i.e., up, down, left, right, forward, backward, etc.).

Arrow 452 depicts, user 405 repeating the randomly selected phrase key to the microphone 428 of personal device 430. In an additional embodiment, a set of sensors (not shown) on personal device 430 may detect and record movement direction of personal device 430, when the movement is based on the set of instructions directing user 405 to move personal device 430 in a pattern of identifiable and detectable directions.

VACA 432 receives the phrase key spoken by user. VACA 432 may then collects and parses the phrase key through acoustic speech recognition and/or natural language processing.

In an embodiment, VACA 432 may provide user a listing of one or more services of which user 405 may select to indicate as the one or more target service(s). As depicted in FIG. 4, user 405 selected two target services (i) news app 434 and (ii) music app 436. Thereafter, VACA 432 sends the parsed text of the phrase key to news app 434 and music app 436. VACA 432 may also send the target services (to news app 434 and music app 436) instructions to have the respective servers communicate with the virtual assistant server to compare the parsed text of the phrase key to that of the ground truth associated with the phrase key.

Arrow 454a depicts news app 434 communicating with and sending the parsed text of the phrase key to news server 414. Thereafter, arrow 456a depicts news server 414 in communication with virtual assistant server 412. For example, arrow 456a depicts news server 414 communicating with and sending the parsed text of the phrase key to virtual assistant server 412. Similarly, arrow 454b depicts music app 436 communicating with and sending the parsed text of the phrase key to music server 416. Thereafter, arrow 456b depicts music server 414 in communication with virtual assistant server 412. For example, arrow 456b depicts music server 416 communicating with and sending the parsed text of the phrase key to virtual assistant server 412.

Virtual assistant server 412 analyzes and compares the parsed text of the phrase key, from each server (news server 414 and music server 416) individually, to that of the ground truth associated with the phrase key. If virtual assistant server 412 determines the received parsed text of the phrase key substantially matches the ground truth, then virtual assistant server 412 along with target service server (i.e., news server 414, music server 416, etc.) pushes user's credentials, along arrow 458, to virtual assistant device 420. For example, virtual assistant server 412 may send a notification of a match, along arrow 456a and 456b to news server 414, and/or music server 416, receptively, between the received parsed text of the phrase and the ground truth. Thereafter each respective server (news server 414 and music server 416) may send to virtual assistant server 412 a set of user credentials, to allow virtual assistant device 420 to access the respective services of news server 414 and music server 416. For instance, if virtual assistant server 412 determines the parsed text of the phrase key from news server 414 substantially matches the ground truth, then virtual assistant server 412 will notify the news server 414 of a match and receive the user credentials from the news server 414 and forward the received credentials to virtual assistant device 420. For another example, if virtual assistant server 412 determines the parsed text of the phrase key from news server 414 substantially matches the ground truth, then virtual assistant server 412 will create a link between virtual assistant device 420 and news server 414 allowing user 405 credentials to be pushed to virtual assistant device 420. Thereafter user 405 may access the account associated with news app 434 on virtual assistant device 420.

Virtual assistant server 412 may determine a substantial match when the parsed text of the phrase key is within a predetermined threshold to the ground truth. Additionally, and/or alternatively, a substantial match may be determined based upon an error coefficient based on the acoustic speech recognition techniques utilized by personal device 430. Additionally, and/or alternatively, a substantial match may be determined based upon a predetermined error rate. Additionally, and/or alternatively, a substantial match may be determined based upon a linguistic analysis of the received parsed text of the phrase key. Additionally, and/or alternatively, the match may need to be exact.

Authentication program 422 along with VACA 432 improves ease of use for user 405. For example, user 405 may speak one phrase and have all user 405 accounts with target service(s) pushed to virtual assistant device 420 without being required to provide user credentials for each service. Additionally, authentication program 422 along with VACA 432 improves security as the phrase key is (i) randomly selected, (ii) user 405 is not required to provide user credentials which could be stolen, and (iii) user 405 may prevent eavesdroppers by limiting others in the area. Therefore, authentication program 422 along with VACA 432 may prevent a target service credentials from being spoofed and/or stolen.

Figure 5:
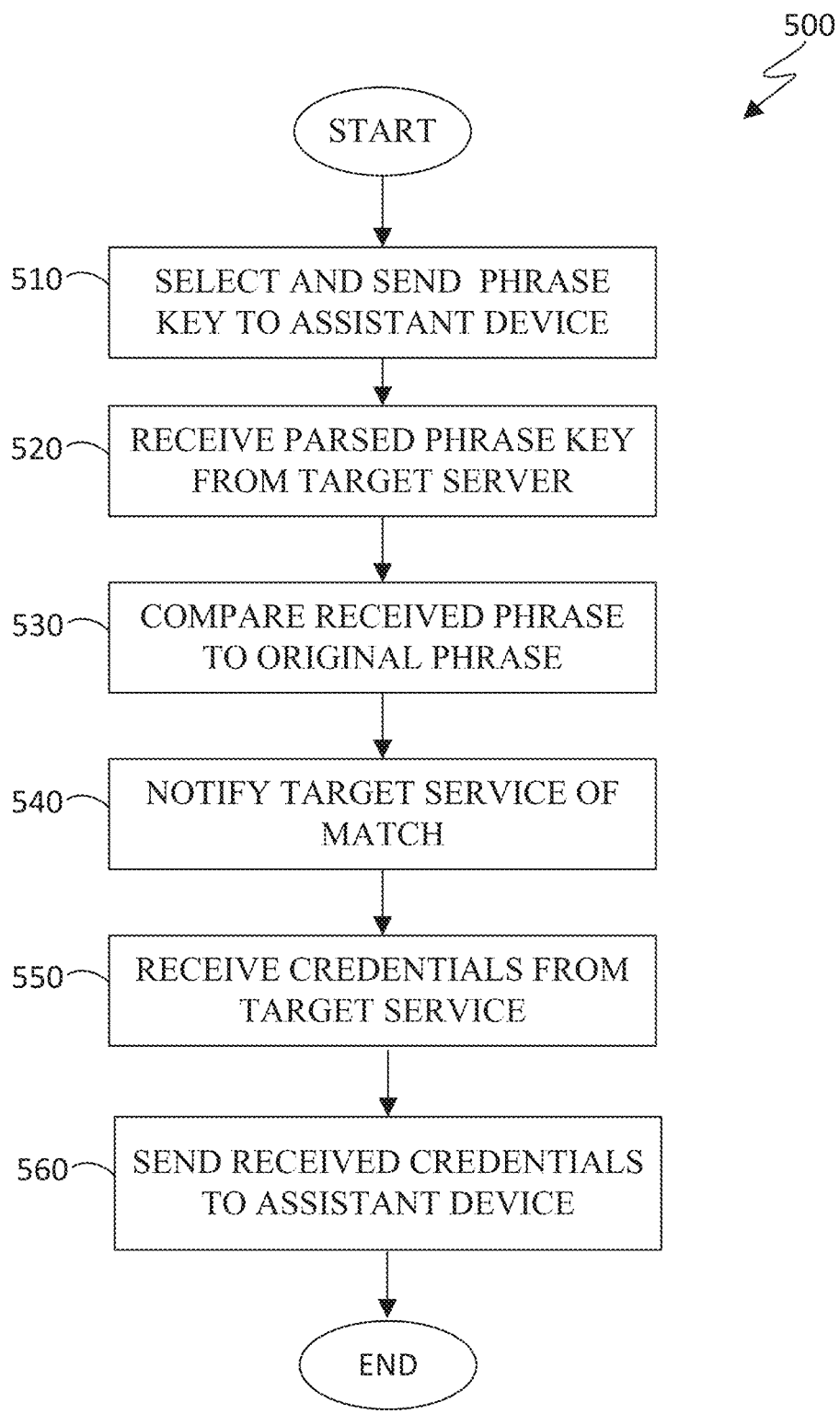
FIG. 5 illustrates an example flowchart for authentication and service provisioning, according to this disclosure.

Reference is now made to FIG. 5. FIG. 5 depicts exemplary flowchart 500, for authentication and service provisioning respective to virtual assistant server 412, according to this disclosure. For example, the process depicted in FIG. 5 is described as implemented by the server 200, in FIG. 2, or virtual assistant server 412, with respect to electronic device such as any one of the client devices 106-115, virtual assistant device 420 or personal device 430.

The process begins with virtual assistant server 412 selecting and sending a phrase key (step 510). For example, in step 510, server 200 may randomly select a phrase key from an information repository. The selected phrase key is associated with a ground truth which contains the accurate verbal representation of the phrase key. The phrase key may be any sequential string of numbers and/or words. For another example, in step 510, server 200 may in addition to selecting a phrase key randomly select a set of instructions. The set of instructions to a user which instruct user to physically move personal device 430 in a set pattern. In alternative embodiments, as discussed above, virtual assistant server 412 may not select a phrase key; rather virtual assistant server 412 may receive a ground truth from virtual assistant device 420, or another similar device.

The process then sends the selected phrase key to virtual assistant device 420. For example, in step 510, server 200 transmits to client device 115 the selected phrase key. In alternative embodiments, virtual assistant server 412 may not select and send phrase key to assistant device; rather virtual assistant server 412 may receive a ground truth from virtual assistant device 420, or another similar device.

After a period of time, the process receives the parsed text of the phrase key from one or more target services (step 520). For example each target server may be similar to server 200 of FIG. 2. The received parsed text of the phrase key may be based on acoustic speech recognition of the phrase key spoken by a user. In an embodiment, the one or more target services may also send user identification along with the parsed text of the phrase key. The user identification may include, for example, an email address, a log in user name, etc.

The process then compares the received parsed text of the phrase key to a ground truth containing the original phrase key to determine the accuracy of the received parsed text (step 530). The ground truth contains the accurate verbal representation of the phrase key. If the received parsed text of the phrase key does not substantially match the ground truth, then the process may notify the user that it failed to authenticate the user. Additionally, and/or alternatively the system may initiate a protocol requesting the user to repeat the phrase key again. Additionally, and/or alternatively the system may initiate a protocol to start over at step 510 and select a new phrase key.

If the received parsed text of the phrase key substantially matches the ground truth, thereby providing authentication of the user, then in step 540 the process notifies the target service of the match. By notifying the target service of a match, a level of confidence is established as it confirms the identity of the user. For example, the same user has access to virtual assistant device 420, by requesting access to one or more target services. The same user has access to personal device, containing the target service applications, and receives the spoken phrase key.

Upon notifying the target service that the user is authenticated, the process receives user credentials from the one or more target services (step 550). In an embodiment the received credentials may be a passphrase. In an embodiment the received credentials may be a username and passphrase. In an embodiment the received credentials may be a temporary passphrase. For example, in response to the target service being notified of the user's authentication through the pass phrase, the target service may send only a single use temporary passphrase to be utilized by the virtual assistant device 420. In another embodiment, in addition to receiving user credentials, user personalization and customization of services may also be received from target service server. For example, the target service may send to virtual assistant server 412 a personalization profile of the users, in addition to or in place of the user credentials. Similarly, the target service may send to virtual assistant server 412 a customization profile of the users, in addition to or in place of the user credentials. Those skilled in the art appreciate that alternative methods of authentication may be received from target service. Upon receipt of user credentials from target service, the process pushes the user credentials to the virtual assistant device 420 (step 560). For example, virtual assistant server 412 passes the user credentials to virtual assistant device 420, thereby providing virtual assistant device 420 the user credentials to access the users account associated with the target service. In an alternative embodiment, steps 550 and 560 may be a single process in which virtual assistant server 412 establishes a link to between the target service and the virtual assistant device 420 thereby allowing the target service to push the associated user credentials to virtual assistant device 420. For example, by comparing the received parsed text of the phrase key to the ground truth to determine the received parsed text substantially matches match the ground truth the process may authenticate the user and push the user's service credential profile from the target service to the virtual assistant device 420.

Figure 6:
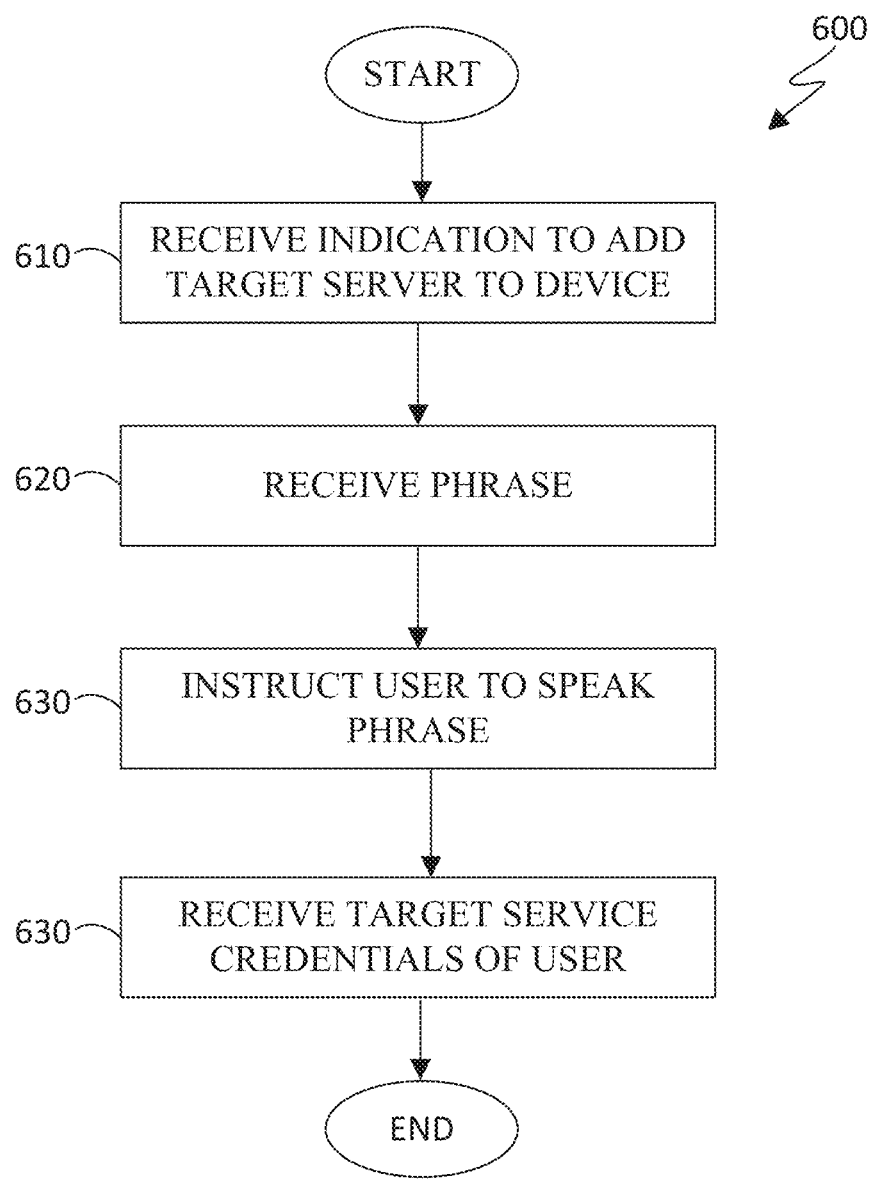
FIG. 6 illustrates an example flowchart for authentication and service provisioning, according to this disclosure.

Reference is now made to FIG. 6. FIG. 6 depicts exemplary flowchart 600, for authentication and service provisioning respective to virtual assistant device 420, according to this disclosure. For example, the process depicted in FIG. 6 is described as implemented by one/or more client device such as any one of the client devices 106-115 in FIG. 1, electronic device 300, in FIG. 3, virtual assistant device 420 in FIG. 4 and/or personal device 430 in FIG. 4

The process begins with virtual assistant device 420 receiving an indication to provision a one or more target service on assistant device 420 (step 610). For example, a target service may require user to provide authentication and credentials prior to granting the user access to the offered services of the target serve. Embodiments of the present disclosure provide a method and system to provide authentication of user on virtual assistant device 420 without requiring user to provide authentication and credentials (i.e., user name identification and password).

Upon receiving an indication to add a target service to virtual assistant device 420, the process continues as virtual assistant device 420 receives a phrase key (step 620). In an embodiment, virtual assistant device 420 may also receive a set of instructions to a user which instruct user to physically move personal device 430 in a set pattern. In alternative embodiments, as discussed above, virtual assistant device 420 may not receive a phrase key; rather it may select one itself from an information repository and/or generate and send a ground truth to virtual assistant server 412, or another similar device.

Upon receiving the phrase key, in step 630, the virtual assistant device 420 instructs user to speak the phrase key towards a client device 106-115 which can utilize VACA 432. In an additional embodiment in step 630, virtual assistant device 420 may instruct the user to move a client device 106-115, which can detect movement and can utilize VACA 432, in a sequence of directions. In an alternative embodiment, in step 630 virtual assistant device 420 instructs a client device 106-115 which can utilize VACA 432 to display and request user to read the phrase key.

Finally, in step 640, virtual assistant device 420 receives user credentials from the target service. In an embodiment the credentials may be pushed from virtual assistant device server 412, or a server associated with virtual assistant device 420. In an alternative embodiment the credentials may be pushed from one or more servers to virtual assistant device 420. In an alternative embodiment, a link may be created between a virtual assistant device 420 and personal device 430 in which VACA pushes the credentials from the target service on personal device 430 to the virtual assistant device 420. Thereafter, virtual assistant device 420 may notify user that the target service is configured.

Although FIGS. 5 and 6 illustrate examples of processes for authentication and service provisioning, various changes could be made to FIG. 5 and/or FIG. 6. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A server comprising:
   a communication interface configured to communicate with a virtual assistant device (VAD) and a target server associated with a target service; and
   at least one processor coupled to the communication interface, the at least one processor configured to:
      receive, via the communication interface, an indication for authenticating the target service on the VAD, wherein the target service is currently authenticated with a personal device based on a set of user credentials,
      receive, via the communication interface from the target server, a file generated by the personal device that includes parsed data based on speech recognition processing of a phrase spoken by a user, wherein the phrase spoken by the user is based on a phrase key that the VAD randomly selected and provided to the user,
      receive, via the communication interface from the VAD, the phrase key that the VAD randomly selected and provided to the user,
      determine that the parsed data matches the phrase key,
      in response to determining that the parsed data matches the phrase key, send, via the communication interface, a first notification to the target server establishing that the user that accessed the target service through the personal device is the user that accessed the VAD,
      receive, via the communication interface from the target server, the set of user credentials that authenticates the target service with the personal device, and
      send, via the communication interface, the set of user credentials to the VAD for authenticating the target service and providing the VAD access to the target service.

2. The server of claim 1, wherein the at least one processor is further configured to analyze the parsed data to identify whether the parsed data is within a predetermined threshold to the phrase key, which corresponds to the determination that the parsed data matches the phrase key, and
   wherein the predetermined threshold is based on at least one of an error coefficient of the speech recognition processing, an error rate, or a linguistic analysis of the parsed data.

3. The server of claim 1, wherein the at least one processor is further configured to:
   select a set of instructions, wherein the set of instructions comprises audible directions for the user to move the personal device;
   transmit, via the communications interface, the set of instructions to the VAD;
   determine whether the received file further comprises movement data from a set of sensors configured to detect movement and direction of movement;
   in response to determining that the received file comprises the movement data, compare the set of instructions to the movement data; and
   send, via the communication interface, a second notification to the target server that the movement data matches the set of instructions.

4. The server of claim 1, wherein the at least one processor is further configured to:
   receive, via the communication interface, a set of instructions, wherein the set of instructions comprises audible directions for the user from the VAD;
   determine whether the received file further comprises movement data from a set of sensors configured to detect movement and direction of movement;
   in response to determining that the received file comprises the movement data, compare the set of instructions to the movement data; and
   send, via the communication interface, a second notification to the target server that the movement data matches the set of instructions.

5. The server of claim 1, wherein the at least one processor is further configured to request the set of user credentials via the first notification.

6. The server of claim 1, wherein the set of user credentials comprises a personalization profile of the user.

7. The server of claim 1, wherein the received file further comprises a user identification.

8. A virtual assistant device (VAD) comprising:
   a transceiver configured to communicate with a server;
   a speaker configured to play an audio data file to a user; and
   at least one processor coupled to the transceiver and the speaker, the at least one processor configured to:
      receive, via the transceiver, a request to authenticate a target service on the VAD, wherein the target service is associated with a user account and currently authenticated with a personal device by a set of user credentials;
      select a phrase key;
      notify the user to verbally recite the phrase key to the personal device;
      transmit, to the server via the transceiver, the phrase key that was selected and provided to the user to establish that the user that accessed the target service through the personal device is the user that accessed the VAD;
      receive, from the server via a target server associated with the target service, the set of user credentials that authenticates the personal device to the target service after the user verbally recites the phrase key; and use the set of user credentials to access the user account associated with the target service as a result of the verbal recitation matching the phrase key.

9. The VAD of claim 8, wherein the at least one processor is further configured to broadcast, via the speaker, the phrase key to the user.

10. The VAD of claim 8, wherein:

the at least one processor is configured to select the phrase key from a plurality of phrase keys, the phrase key is in a language based on a language indicator of the VAD, and the phrase key is operably spoken by the user.

11. The VAD of claim 8, wherein the at least one processor is further configured to:

select a set of instructions, wherein the set of instructions comprises directions for the user to move the personal device;

transmit, via the transceiver, the set of instructions to the server; and notify the user to follow the set of instructions for moving the personal device.

12. The VAD of claim 8, wherein the at least one processor is further configured to:

receive, via the transceiver, a set of instructions from the server, wherein the set of instructions comprises directions for the user to move the personal device; and notify the user to follow the set of instructions for moving the personal device.

13. The VAD of claim 8, wherein the at least one processor is further configured, after receiving the set of user credentials, to configure the user account associated with the target service on the VAD based on the set of user credentials, wherein the set of user credentials comprises a user personalization profile to personalize the target service on the VAD.

14. A method comprising:

receiving an indication for authenticating a target service on a virtual assistant device (VAD), wherein the target service is currently authenticated with a personal device based on a set of user credentials;

receiving, from a target server associated with the target service, a file generated by the personal device that includes parsed data based on speech recognition processing of a phrase spoken by a user, wherein the phrase spoken by the user is based on a phrase key that the VAD randomly selected and provided to the user;

receiving, from the VAD, the phrase key that the VAD randomly selected and provided to the user;

determining that the parsed data matches the phrase key;

in response to determining that the parsed data matches the phrase key, sending a notification to the target server establishing that the user that accessed the target service through the personal device is the user that accessed the VAD;

receiving, from the target server, the set of user credentials that authenticates the target service with the personal device; and sending the set of user credentials to the VAD for authenticating the target service and providing the VAD access to the target service.

15. The method of claim 14, further comprising:

receiving the phrase key from the VAD.

16. The method of claim 14, further comprising:

selecting a set of instructions, wherein the set of instructions comprises audible directions for the user to move the personal device;

transmitting the set of instructions to the VAD;

determining whether the received file further comprises movement data from a set of sensors, wherein the movement data comprises movement and direction of movement of the personal device;

responsive to determining that the received file comprises the movement data, comparing the set of instructions to the movement data; and notifying the target server that the movement data matches the set of instructions.

17. The method of claim 14, further comprising:

analyzing the parsed data to identify whether the parsed data is within a predetermined threshold to the phrase key, which corresponds to the determination that the parsed data matches the phrase key, wherein the predetermined threshold is based on at least one of an error coefficient of the speech recognition processing, an error rate, or a linguistic analysis of the parsed data.

18. The method of claim 14, wherein the set of user credentials comprises a personalization profile of the user.

19. The method of claim 14, wherein the received file further comprises a user identification.

20. The method of claim 14, further comprising:

requesting the set of user credentials via the notification.

* * * * *